US011256492B2

(12) United States Patent
Rainbird et al.

(10) Patent No.: US 11,256,492 B2
(45) Date of Patent: Feb. 22, 2022

(54) COMPUTER PROGRAM TRUST ASSURANCE FOR INTERNET OF THINGS (IOT) DEVICES

(71) Applicant: Inlecom Systems Ltd, London (GB)

(72) Inventors: Jenny Rainbird, Bexleyheath (GB); Alexander Papageorgiou, Athens (GR); Konstantinos Loupos, Athens (GR); Patrick J. O'Sullivan, Dublin (IE); Antonios Mygiakis, Chalandri (GR)

(73) Assignee: Inlecom Systems Ltd., London (GB)

( * ) Notice: Subject to any disclaimer, the term of this patent is extended or adjusted under 35 U.S.C. 154(b) by 0 days.

(21) Appl. No.: 16/894,129

(22) Filed: Jun. 5, 2020

(65) Prior Publication Data

US 2021/0382704 A1    Dec. 9, 2021

(51) Int. Cl.
| | |
|---|---|
| *G06F 9/445* | (2018.01) |
| *G06F 8/61* | (2018.01) |
| *G06F 21/78* | (2013.01) |
| *G06F 21/57* | (2013.01) |
| *G16Y 30/10* | (2020.01) |
| *H04L 9/06* | (2006.01) |
| *G06F 8/41* | (2018.01) |

(52) U.S. Cl.
CPC ............ *G06F 8/61* (2013.01); *G06F 8/43* (2013.01); *G06F 21/57* (2013.01); *G06F 21/78* (2013.01); *G16Y 30/10* (2020.01); *H04L 9/0637* (2013.01); *H04L 2209/38* (2013.01)

(58) Field of Classification Search
CPC ........................................................ G06F 8/61

USPC ......................................................... 717/174
See application file for complete search history.

(56) References Cited

U.S. PATENT DOCUMENTS

| | | | |
|---|---|---|---|
| 2003/0191942 A1 | 10/2003 | Sinha et al. | |
| 2007/0277037 A1* | 11/2007 | Langer | ................. H04L 9/3247 713/176 |
| 2017/0115981 A1* | 4/2017 | Oh | ......................... G06F 21/64 |
| 2017/0277890 A1 | 9/2017 | Hayrynen et al. | |
| 2019/0340379 A1* | 11/2019 | Beecham | ............ G06F 16/9014 |

(Continued)

OTHER PUBLICATIONS

Yohan Alexander, et al., "An Over-the-Blockchain Firmware Update Framework for IoT Devices," 2018 IEEE Conf. (DSC), Dec. 10, 2018, pp. 1-8.

*Primary Examiner* — Evral E Bodden
(74) *Attorney, Agent, or Firm* — CRGO Global; Steven M. Greenberg

(57) ABSTRACT

A method for computer program source level trust assurance in an Internet of Things (IoT) device includes receiving a request to install a computer program in an IoT device and storing, in temporary memory, a file containing a binary form of the computer program and an authenticity fingerprint incorporated as part of the binary form of the computer program. The method additionally includes extracting the authenticity fingerprint from the binary form of the computer program, retrieving a different fingerprint from remote storage and comparing the different fingerprint to the extracted fingerprint. Finally, the method includes installing the computer program into the IoT device in response to the comparison indicating that the extracted fingerprint is identical to the different fingerprint, but otherwise rejecting the request to install the computer program.

17 Claims, 2 Drawing Sheets

(56) References Cited

U.S. PATENT DOCUMENTS

2020/0401678 A1\* 12/2020 Salomon ................. G06F 21/16
2021/0006561 A1\* 1/2021 Sardesai ............... H04L 63/101

\* cited by examiner

COMPUTER PROGRAM TRUST ASSURANCE FOR INTERNET OF THINGS (IOT) DEVICES

BACKGROUND OF THE INVENTION

Field of the Invention

The present invention relates to the field of Internet of Things (IoT) and more particularly to the securing of IoT devices.

Description of the Related Art

IoT refers to a vast web of connected devices over the global Internet by way of the instrumentation and connectibility of ordinary machines and devices ranging from toasters to automobiles. Literally, anything that can be powered on or off, once instrumented for IoT permits, one-way or two-way interactions over the Internet. These interactions can range from merely reporting a status of a sensor, for instance an ordinary value, to receiving directives effectively remotely operating an IoT enabled device. While the advantages of IoT enabling a machine are substantial, those advantages come at a cost—the creation of a security vulnerability in the machine. Generally, IoT enabled devices incorporate an embedded computing system of a processor, memory, persistent storage, and an operating system through which one or more computer programs may execute. But, in many instances, an IoT enabled device need not include an operating system. Rather, in some instances the IoT enabled device includes only firmware loadable at bootstrap operable to perform functions without loading thereafter an operating system.

In this regard, as a stand-alone unit, a stand-alone device or machine including a sensor is impervious to remote threats for the most part. But, just like any other connected personal computer, a device or machine configured for IoT becomes vulnerable to remote threats including network intrusions. In this regard, like other devices, an IoT device is able to detect and deter a breach of its integrity by monitoring the introduction of code in the memory of the IoT device in order to detect malicious code. But, the program logic able to do generally is included as part of the underlying operating system, or as part of a computer program executing under management by the operating system. Consequently, malicious code, surreptitiously inserted into the IoT device before the loading of the operating system—namely the firmware, can avoid detection by operating system or post-operating system level countermeasures.

BRIEF SUMMARY OF THE INVENTION

Embodiments of the present invention address deficiencies of the art in respect to IoT device security and provide a novel and non-obvious method, system and computer program product for computer program trust assurance in an IoT device. In an embodiment of the invention, a method for computer program trust assurance in an IoT device includes receiving a request to install a computer program in an IoT device and storing, in temporary memory, a file containing a binary form of the computer program and an authenticity fingerprint incorporated within the binary form of the computer program. The method additionally includes extracting the authenticity fingerprint from the file and retrieving a different fingerprint from remote storage. The method yet further includes comparing the extracted fingerprint and the retrieved fingerprint. Finally, the method includes installing the computer program into the IoT device in response to the comparison indicating that the extracted fingerprint is identical to the different fingerprint, but otherwise rejecting the request to install the computer program.

In one aspect of the embodiment, the extracted fingerprint includes data generated during compilation of the computer program by a compiler of the computer program. For instance, the data can include parameters established for conducting the compilation process, a number of compiler errors or compiler warnings generated during compilation, a count of a number of variables of a particular type declared for a portion of the computer program, a timestamp when the compilation was initiated or completed, a number of seconds consumed during the compilation, or an identity of a developer responsible for the compilation, to name only a few examples.

In another aspect of the embodiment the temporary memory is disposed within the IoT device. In yet another aspect of the embodiment, the computer program has a library compiled therewith. The library includes a function that, during compilation gathers at least one compilation contextual value and stores the contextual value within the binary form while also generating a separate fingerprint external to the binary form and storing the separate fingerprint in remote storage, such as within a block in a blockchain. Optionally, the contextual value is a registration number of a developer of the computer program, which corresponds to an electronic resume of the developer.

In another embodiment of the invention, a data processing system is configured for computer program trust assurance in an IoT device. The system includes memory and at least one processor and a trust assurance module that includes computer program instructions. The instructions are enabled upon execution in the memory by the at least one processor to receive a request to install a computer program in an IoT device and to store, in temporary memory, a file containing a binary form of the computer program and an authenticity fingerprint included as part of the binary form of the computer program. The program instructions also are enabled to extract the authenticity fingerprint from the file and to retrieve from remote storage, a different fingerprint. The program instructions yet further are enabled to compare the retrieved fingerprint and the extracted fingerprint. Finally, the program instructions are enabled to install the computer program into the IoT device responsive to the comparison indicating that the fingerprints are the same, but otherwise to reject the request to install the computer program.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for computer program trust assurance in an IoT device. In accordance with an embodiment of the invention, a computer program intended for deployment onto an IoT device incorporates compile-time meta-data within the computer program and concurrently stores the compile-time meta-data within remote storage. Optionally, the function is included as part of a library linked with a compiled object of the computer program in order to produce an executable form of the computer program. As well, during the compilation and linking of the computer program, the compile-time data is emitted so that the meta-data may then be transmitted to the remote storage and subsequently used to test the authenticity of the computer program by comparing the emitted data with that stored within the computer program itself. In this way, the IoT device can be assured of an authentic and secure deployment of the computer program absent unknown tampering.

Figure 1:
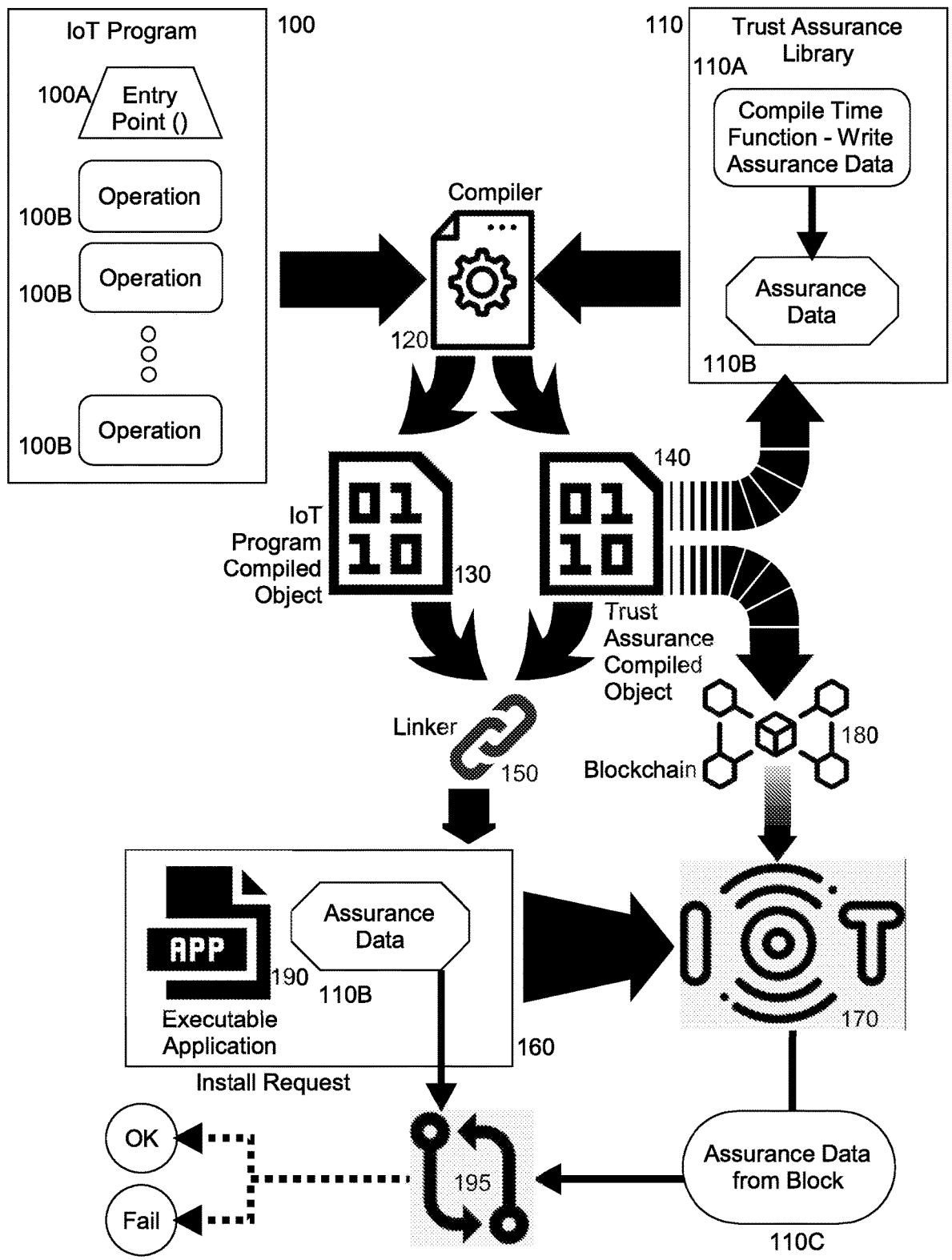
FIG. 1 is a pictorial illustration of a process for computer program trust assurance in an IoT device.

In further illustration, FIG. 1 pictorially shows a process for computer program trust assurance in an IoT device. As shown in FIG. 1, a computer program 100 includes source code defining an entry point 100A into the computer program and one or more different functions 100B. A trust assurance library 110, in turn, provides for a compile time function 110A and assurance data 110B. In this regard, the compile time function 110A includes program instructions adapted, during compile-time, to capture meta-data regarding the compilation of the computer program 100 into a compiled IoT object 130 and to write the captured meta-data as assurance data 110B to a resultant compiled trust assurance library object 140. The compile time function 110A additionally emits, at compile-time, a copy of the assurance data 110B for remote storage separate from both the IoT program compiled object 130 and also the compiled library object 140 within a block of a blockchain 180 at a specific, network addressable location.

A linker 150 then links together the compiled IoT object 130 and the compiled trust assurance library object 140 to produce an executable application 190 incorporating the assurance data 110B as an authenticity fingerprint. Thereafter, in response to a request 160 to install the executable application 190 onto an IoT device 170, the assurance data 110B is extracted from the executable application 190 and the remotely stored assurance data 110C may be retrieved from the blockchain 180 at the network address for comparison with the extracted assurance data 110B. To the extent that the comparison operation 195 operating on the assurance data 110C from the blockchain 180 and the assurance data 110B extracted from the executable application 190 produces a match, an indication of assurance is returned—a permissible build of the executable application 190, but otherwise, an indication of failure is returned.

Figure 2:
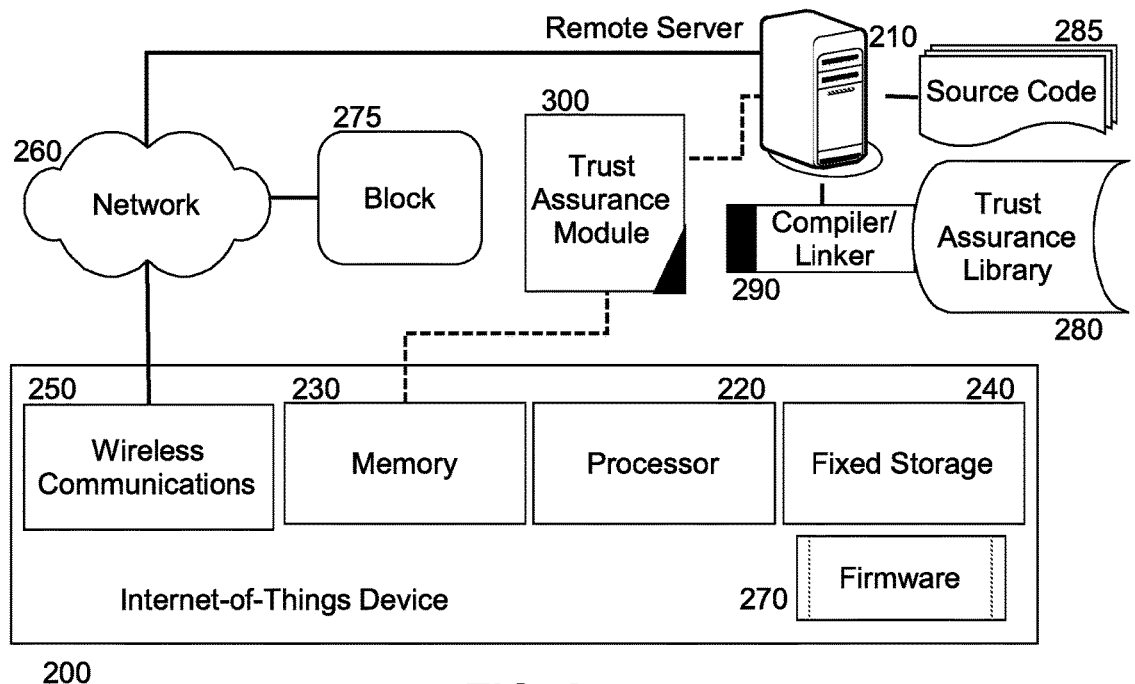
FIG. 2 is a schematic illustration of a data processing system configured for computer program trust assurance in an IoT device; and, FIG. 3 is a flow chart illustrating a process for computer program trust assurance in an IoT device.

The process described in connection with FIG. 1 may be implemented in a computer data processing system. In further illustration, FIG. 2 schematically illustrates a data processing system configured for computer program trust assurance in an IoT device. The system includes an IoT enabled device 200 that includes a processor 220, memory 230, fixed storage 240, wireless communications 250 and firmware 270. The IoT enabled device 200 is communicatively coupled to a remote server 210 over computer communications network 260. The remote server 210 includes a compiler/linker 290 executing in the remote server 210 and operable to compile source code 285 and a trust assurance library 280 into respective program objects and to link those objects into a computer program for deployment in the IoT enabled device 200 as the firmware 270.

In this regard, during the compilation of the trust assurance library 280 by the compiler/linker 290, meta-data contemporaneous with the compilation of the trust assurance library 280 and the source code 285 may be selected and incorporated into the resulting computer program as an authenticity fingerprint reflective of trust assurance data. Exemplary meta-data includes a register state at the time of compilation, a number of lines of the source code 285, a time of day and date of the compilation, an identity of a developer of the source code 285, a number of compiler warnings generated during compilation, or a hash value of a portion or all of the source code 285, to name only a few examples. As well, during compilation, the meta-data may be emitted into a text file that is separate from the resulting compiled form of the trust assurance library 280 and the source code 285 and remotely stored in a block 275 of a blockchain accessible at a specified network address.

Of note, the system also includes a source level trust assurance module 300. The module source level trust assurance module 300 includes computer program instructions operable during execution by the remote server 210, or optionally during execution by the processor 220 of the IoT enabled device 200, to receive a request to install a computer program as the firmware 270 of the IoT enabled device 200. The program instructions are enabled to respond to the request by extracting therefrom the authenticity fingerprint indicative of the trust assurance data and to retrieve a remote fingerprint from a specified address on the block 275. The program instructions yet further are enabled to compare the extracted fingerprint to the retrieved fingerprint to determine if the assurance data of the extracted fingerprint matches the meta-data stored within the retrieved fingerprint. The program instructions even yet further are enabled to deny installation of the computer program as the firmware 270 on the condition that the assurance data of the authenticity fingerprint extracted from the firmware 270 does not match the meta-data stored within the retrieved fingerprint.

Figure 3:
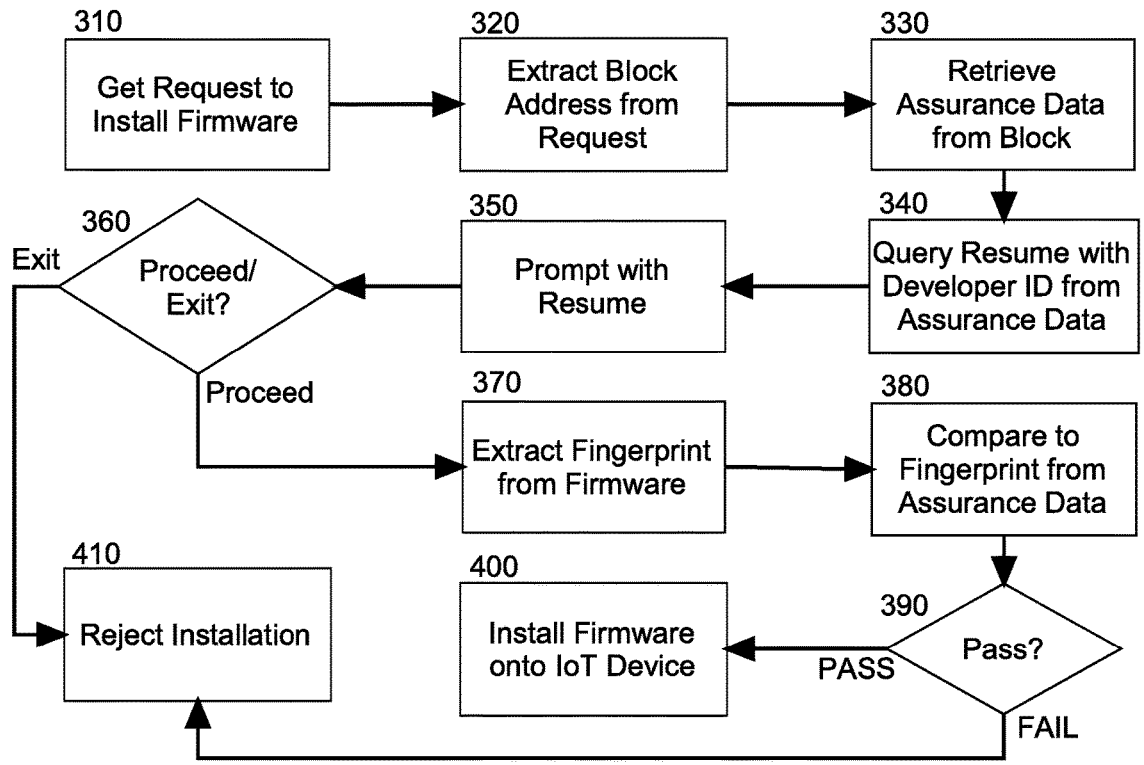

In even yet further illustration of the operation of the source level trust assurance module 300, FIG. 3 is a flow chart illustrating a process for computer program trust assurance in an IoT device. Beginning in block 310 a request is received to install firmware onto an IoT device. In block 320, an address is received with the request and used to retrieve from a block on the blockchain, a remotely disposed fingerprint. In block 330, a developer identifier is located in assurance data of the retrieved fingerprint and in block 340, an Internet query is issued in correspondence with the developer identifier in order to retrieve a developer resume identifying the developer and a published rating for the developer. In block 350, the developer and rating are included in a prompt for a user interface of the source level trust assurance module.

In decision block 360 it is determined whether or not to proceed with an attempt to deploy the firmware with respect to the developer resume of the prompt. If not, the request to deploy the firmware is rejected in block 410. But otherwise, in block 370, an authenticity fingerprint is extracted from within the firmware itself. Then, in block 380, the extracted fingerprint is compared to the fingerprint retrieved from the block on the blockchain. In decision block 390 it is determined if a match is returned. If so, in block 400 the firmware is installed onto the IoT device. But otherwise, the installation is rejected in block 410.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for computer program source level trust assurance in an Internet of Things (IoT) instrumented device, the method comprising:
   receiving a request to install a computer program in an IoT device;
   storing, in temporary memory, a file containing a binary form of the computer program and an authenticity fingerprint separate from the binary form of the computer program;
   extracting the fingerprint from the file into the temporary memory, executing the binary form of the computer program with a portion of the fingerprint as an input parameter to the execution of the computer program, the execution of the computer program with the portion of the fingerprint returning a value; and, installing the computer program into the IoT device responsive to the value indicating authenticity of the computer program, but otherwise rejecting the request to install the computer program;

wherein the computer program has a library compiled therewith, the library including a function that, during compilation gathers at least one compilation contextual value and stores the contextual value within the binary form while also generating a separate fingerprint external to the binary form, the library also including a function that upon receiving the separate fingerprint, compares the fingerprint to the context value stored within the binary form and returns an indication of authenticity on condition that the fingerprint matches the context value.

2. The method of claim 1, wherein the fingerprint comprises data generated during compilation of the computer program by a compiler of the computer program.

3. The method of claim 2, wherein the computer program upon receiving as input the fingerprint, compares the data of the fingerprint with the data generated during compilation the computer program as stored within the computer program and returns the value indicating authenticity on condition that the data of the fingerprint and the data stored within the computer program matches.

4. The method of claim 1, wherein the temporary memory is disposed within the IoT device.

5. The method of claim 1, wherein the contextual value is a hash of the binary form.

6. The method of claim 1, wherein the contextual value is a registration number of a developer of the computer program, the library further responding to the receipt of the fingerprint by querying a network repository for a resume of the developer corresponding to the registration number.

7. A data processing system configured for computer program source level trust assurance in an Internet of Things (IoT) instrumented device, the system comprising:
   memory and at least one processor; and,
   a source level trust assurance module comprising computer program instructions enabled upon execution in the memory by the at least one processor to perform:
   receiving a request to install a computer program in an IoT device;
   storing, in temporary memory, a file containing a binary form of the computer program and a fingerprint separate from the binary form of the computer program;
   extracting the fingerprint from the file, executing the binary form of the computer program with a portion of the fingerprint as an input parameter to the execution of the computer program, the execution of the computer program with the portion of the fingerprint returning a value; and,
   installing the computer program into the IoT device responsive to the value indicating a permissible build of the computer program, but otherwise rejecting the request to install the computer program;
   wherein the computer program has a library compiled therewith, the library including a function that, during compilation gathers at least one compilation contextual value and stores the contextual value within the binary form while also generating a separate fingerprint external to the binary form, the library also including a function that upon receiving the separate fingerprint, compares the fingerprint to the context value stored within the binary form and returns an indication of authenticity on condition that the fingerprint matches the context value.

8. The system of claim 7, wherein the fingerprint comprises data generated during compilation of the computer program by a compiler of the computer program.

9. The system of claim 8, wherein the computer program upon receiving as input the fingerprint, compares the data of the fingerprint with the data generated during compilation the computer program as stored within the computer program, and returns the value indicating a valid build of the computer program, on condition that the data of the fingerprint and the data stored within the computer program matches.

10. The system of claim 7, wherein the temporary memory is disposed within the IoT device.

11. The system of claim 9, wherein the computer program returns the value indicating a valid build of the computer program on condition that the data of the fingerprint refers to a particular build of the computer program corresponding to a specified level of required security for the IoT device.

12. A computer program product for source level trust assurance in an Internet of Things (IoT) instrumented device, the computer program product including a non-transitory computer readable storage medium having program instructions embodied therewith, the program instructions executable by a device to cause the device to perform a method including:
   receiving a request to install a computer program in an IoT device;
   storing, in temporary memory, a file containing a binary form of the computer program and an authenticity fingerprint separate from the binary form of the computer program;
   extracting the fingerprint from the file, executing the binary form of the computer program with a portion of the fingerprint as an input parameter to the execution of the computer program, the execution of the computer program with the portion of the fingerprint returning a value; and,
   installing the computer program into the IoT device responsive to the value indicating authenticity of the computer program, but otherwise rejecting the request to install the computer program;
   wherein the computer program has a library compiled therewith, the library including a function that, during compilation gathers at least one compilation contextual value and stores the contextual value within the binary form while also generating a separate fingerprint external to the binary form, the library also including a function that upon receiving the separate fingerprint, compares the fingerprint to the context value stored within the binary form and returns an indication of authenticity on condition that the fingerprint matches the context value.

13. The computer program product of claim 12, wherein the fingerprint comprises data generated during compilation of the computer program by a compiler of the computer program.

14. The computer program product of claim 13, wherein the computer program upon receiving as input the fingerprint, compares the data of the fingerprint with the data generated during compilation the computer program as stored within the computer program and returns the value indicating authenticity on condition that the data of the fingerprint and the data stored within the computer program matches.

15. The computer program product of claim 12, wherein the temporary memory is disposed within the IoT device.

16. The computer program of claim 12, wherein the contextual value is a hash of the binary form.

17. The computer program product of claim 12, wherein the contextual value is a registration number of a developer of the computer program, the library further responding to the receipt of the fingerprint by querying a network repository for a resume of the developer corresponding to the registration number.

\* \* \* \* \*